United States Patent
Kim et al.

(10) Patent No.: US 10,298,809 B2
(45) Date of Patent: May 21, 2019

(54) DEVICE FOR SUPPORTING CLOUD PRINT SERVICE AND METHOD OF PROVIDING CLOUD PRINT SERVICE

(71) Applicant: HP PRINTING KOREA CO., LTD., Suwon-si, Gyeonggi-do (KR)

(72) Inventors: A-ri Kim, Suwon-si (KR); Kyung-hoon Kang, Seoul (KR)

(73) Assignee: HP PRINTING KOREA CO., LTD., Suwon-si (KR)

( * ) Notice: Subject to any disclaimer, the term of this patent is extended or adjusted under 35 U.S.C. 154(b) by 84 days.

(21) Appl. No.: 15/160,501

(22) Filed: May 20, 2016

(65) Prior Publication Data

US 2017/0013169 A1    Jan. 12, 2017

(30) Foreign Application Priority Data

Jul. 7, 2015   (KR) ......................... 10-2015-0096781

(51) Int. Cl.
*H04N 1/00* (2006.01)
*H04N 1/44* (2006.01)

(52) U.S. Cl.
CPC ....... *H04N 1/4413* (2013.01); *H04N 1/00204* (2013.01); *H04N 1/00244* (2013.01); *H04N 2201/006* (2013.01); *H04N 2201/0094* (2013.01)

(58) Field of Classification Search
CPC ............ H04N 1/4413; H04N 1/00244; H04N 1/00204; H04N 2201/006; H04N 2201/0094
See application file for complete search history.

(56) References Cited

U.S. PATENT DOCUMENTS

| | | | |
|---|---|---|---|
| 8,825,748 B2 | 9/2014 | Sng et al. | |
| 9,066,044 B2* | 6/2015 | Kimura | H04N 1/4413 |
| 9,177,237 B2* | 11/2015 | Austin | G06F 3/1222 |
| 2012/0113458 A1* | 5/2012 | Benedek | G06F 3/1204 |
| | | | 358/1.15 |
| 2015/0092233 A1* | 4/2015 | Park | G06F 3/1288 |
| | | | 358/1.15 |
| 2015/0248258 A1* | 9/2015 | Ding | G06F 3/1222 |
| | | | 358/1.15 |

* cited by examiner

*Primary Examiner* — Kent Yip
(74) *Attorney, Agent, or Firm* — Staas & Halsey LLP

(57) ABSTRACT

A device for supporting a cloud print service includes a control unit configured to control so that print data generated in a first area is acquired in a second area, a user interface unit configured to provide a user interface for performing user authentication according to the acquisition of the print data and receive authentication information from a user through the user interface, and a communication unit configured to transmit the acquired print data to a cloud print server if the user authentication succeeds by using the received authentication information.

19 Claims, 12 Drawing Sheets

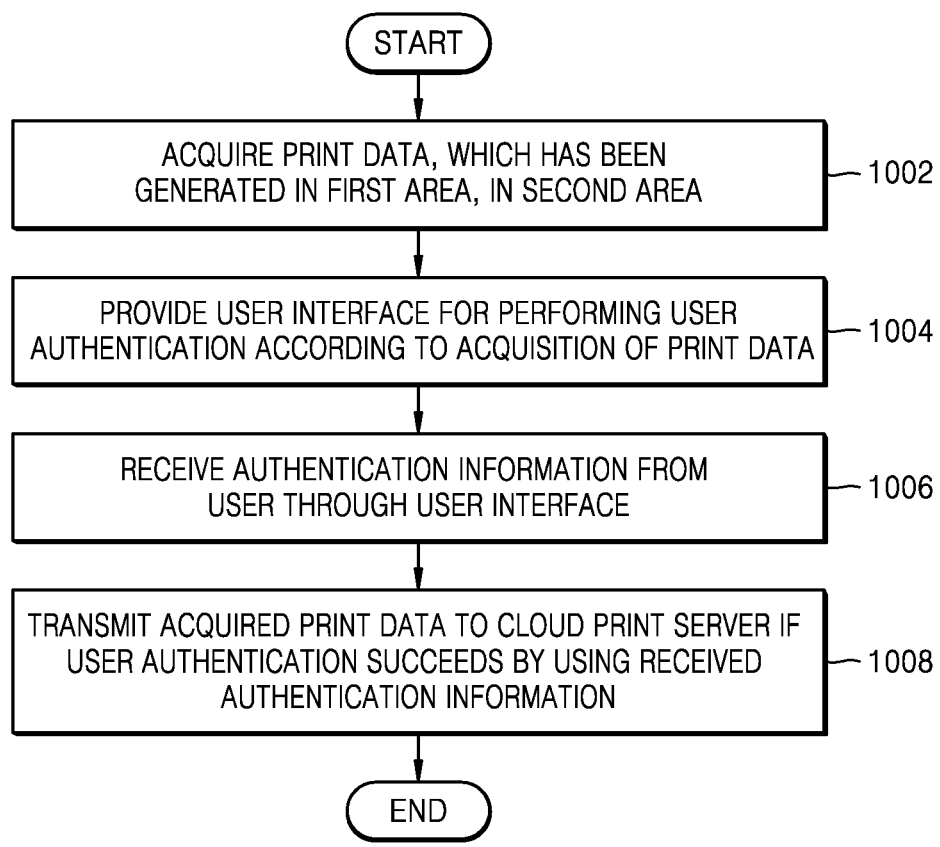

DEVICE FOR SUPPORTING CLOUD PRINT SERVICE AND METHOD OF PROVIDING CLOUD PRINT SERVICE

CROSS-REFERENCE TO RELATED APPLICATION

This application claims the benefit of Korean Patent Application No. 10-2015-0096781, filed on Jul. 7, 2015, in the Korean Intellectual Property Office, the disclosure of which is incorporated herein in its entirety by reference.

BACKGROUND

1. Field

The present disclosure relates to a device for supporting a cloud print service and a method of providing the cloud print service.

2. Description of the Related Art

Types of image forming apparatuses include individual apparatuses such as a printer, a scanner, a copier, and a facsimile and multi-function products (MFPs) in which various functions of different apparatuses are integrated in one apparatus. Recently, image forming apparatuses may be connected to other user devices such as a mobile device and a laptop computer through a network by including a wired communication module such as an Ethernet module or a wireless communication module such as a Wi-Fi module, Wi-Fi Direct module, a near field communication (NFC) module, a Bluetooth module, a Zigbee module, or an infrared data association (IrDA) module. In addition, the image forming apparatuses may access a cloud server by using the modules described above and upload or download a document to or from the cloud server.

In addition, along with the popularization of devices such as a user terminal, methods by which not only a personal computer (PC) but also a mobile device manage and transmit print data are demanded.

SUMMARY

Provided are a device for supporting a cloud print service and a method of providing the cloud print service.

Provided is a non-transitory computer-readable recording medium storing a computer-executable program for executing the method.

Additional aspects will be set forth in part in the description which follows and, in part, will be apparent from the description, or may be learned by practice of the presented exemplary embodiments.

According to an aspect of an exemplary embodiment, a device for supporting a cloud print service includes: a control unit configured to control so that print data generated in a first area is acquired in a second area; a user interface unit configured to provide a user interface for performing user authentication according to the acquisition of the print data and receive authentication information from a user through the user interface; and a communication unit configured to transmit the acquired print data to a cloud print server if the user authentication succeeds by using the received authentication information.

The control unit may include: a print data generation module located in the first area and configured to generate the print data; and a transmission and reception module located in the second area and configured to acquire the generated print data.

The first area may be a system area in which an operating system of the device operates, and the second area may be a user area in which an application program in the device is executed.

The control unit may be further configured to control the communication unit to transmit the authentication information to an authentication server and receive a user authentication performance result from the authentication server.

The control unit may be further configured to execute a user authorization program for providing the user interface for performing the user authentication when the print data is acquired in the second area.

The control unit may be further configured to convert selected content into a predetermined format in response to a request of the user and generate the print data in the first area.

The user interface may display any one of the authentication information and a user authentication performance result received through the communication unit.

The control unit may be further configured to add the authentication information to the acquired print data and transmit the authentication information-added print data to the cloud print server.

According to an aspect of another exemplary embodiment, a method of providing a cloud print service includes: acquiring print data, which has been generated in a first area, in a second area; providing a user interface for performing user authentication according to the acquisition of the print data; and receiving authentication information from a user through the user interface; and transmitting the acquired print data to a cloud print server if the user authentication succeeds by using the received authentication information.

The first area may be a system area in which an operating system of a device operates, and the second area may be a user area in which an application program in the device is executed.

The method may further include: transmitting the authentication information to an authentication server for performing the user authentication; and receiving a user authentication performance result from the authentication server.

The providing of the user interface may include executing a user authorization program for providing the user interface for performing the user authentication when the print data is acquired in the second area.

The acquiring of the print data, which has been generated in the first area, in the second area may include converting selected content into a predetermined format in response to a request of the user and generating the print data in the first area.

The method may further include displaying any one of the authentication information and a user authentication performance result received through a communication unit.

The transmitting of the acquired print data to the cloud print server may include adding the authentication information to the acquired print data and transmitting the authentication information-added print data to the cloud print server.

According to an aspect of another exemplary embodiment, a method of providing a cloud print service includes: providing a user interface for performing user authentication in a second area of a device; receiving authentication information from a user through the user interface; storing the authentication information in a first area of the device if the user authentication succeeds based on the authentication information; receiving information for print option settings from a cloud print server by using the stored authentication information; and providing a user interface for setting print options by using the received information for the print option settings.

According to an aspect of another exemplary embodiment, a non-transitory computer-readable recording medium stores a computer-executable program for executing a method of providing a cloud print service, the method including: providing a user interface for performing user authentication in a second area of a device; receiving authentication information from a user through the user interface; storing the authentication information in a first area of the device if the user authentication succeeds based on the authentication information; receiving information for print option settings from a cloud print server by using the stored authentication information; and providing a user interface for setting print options by using the received information for the print option settings.

The method may further include displaying the received information for the print option settings through the user interface for setting the print options and receiving a selection on the print options from the user.

The information for the print option settings may include information about an available image forming apparatus corresponding to the authentication information, account information of the cloud print server corresponding to the authentication information, and destination information corresponding to the authentication information.

BRIEF DESCRIPTION OF THE DRAWINGS

These and/or other aspects will become apparent and more readily appreciated from the following description of the exemplary embodiments, taken in conjunction with the accompanying drawings in which:

FIG. 10 illustrates a flowchart of a method by which the cloud print server of FIG. 1 provides the cloud print service, according to an exemplary embodiment.

DETAILED DESCRIPTION

Figure 1:
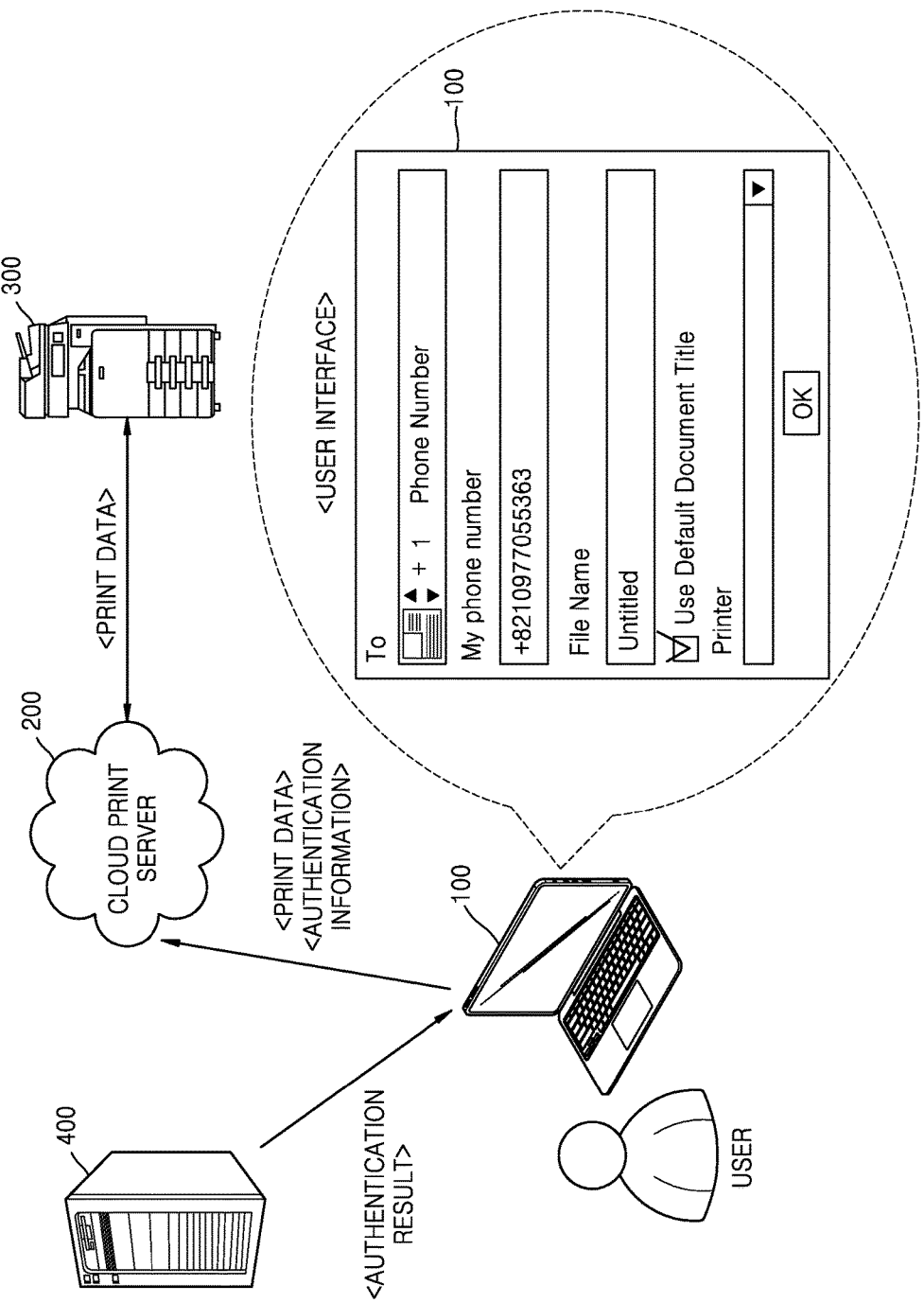
FIG. 1 illustrates a system for providing a cloud print service, according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, expressions such as "at least one of," when preceding a list of elements, modify the entire list of elements and do not modify the individual elements of the list.

In the specification, it should not be analysed that the terms such as "include" and "have" necessarily include all elements or steps described in the specification, and it should be analysed that some of the elements or steps may not be included, or additional elements or steps may be further included.

In addition, in the specification, although terms, such as 'first' and 'second', can be used to describe various elements, the elements cannot be limited by the terms. The terms can be used to classify a certain element from another element.

The present exemplary embodiments relates to a device for supporting a cloud print service and a method of providing the cloud print service, and a detailed description of the features well known to those of ordinary skill in the art to which the exemplary embodiments below belong will be omitted.

FIG. 1 illustrates a system 10 for providing the cloud print service, according to an exemplary embodiment.

Referring to FIG. 1, the system 10 may include a device 100, a cloud print server 200, an image forming apparatus 300, and an authentication server 400. The authentication server 400 may be separated from or integrated with the cloud print server 200.

The device 100 of FIG. 1 may be a user device and include a cellular phone, a smartphone, a personal digital assistant (PDA), a portable multimedia player (PMP), a personal computer (PC), a laptop computer, a tablet PC, or the like.

A user may use the cloud print service to transmit print data such as an image or a document stored in the device 100 of the user to the cloud print server 200 so that the print data is stored in the cloud print server 200 or to the image forming apparatus 300 so that the print data is printed by the image forming apparatus 300.

In this case, the print data stored in the device 100 of the user may be transmitted to an account of the user in the cloud print server 200 based on identification information of the device 100. Alternatively, the print data stored in the device 100 of the user may be transmitted to an account of a third person in the cloud print server 200 based on identification information of a device of the third person. For example, identification information of a device may be a telephone number of a cellular phone or the like as information usable as a destination of print data in correspondence to each account in the cloud print server 200.

For example, the user may request for user authentication by inputting a telephone number of the user into the device 100 or transmit the print data to the account of the third person by inputting a telephone number of the third person.

According to one or more exemplary embodiments, the device 100 may be based on a UNIX series operating system (OS) or support the Common UNIX Printing System (CUPS) that is a printing system of the UNIX series OS. In this case, an operation of the CUPS may be restricted by a technique for security reinforcement. For example, a sandbox technique may be applied as the technique for security reinforcement.

The technique for security reinforcement may restrict, for example, such that internal modules of the CUPS are accessible only to a system folder and only a user interface which does not support a network connection is provided. For example, for the CUPS, user interfaces other than a printer dialog which does not support a network connection may not be provided.

Therefore, for the device 100 supporting the cloud print service, a separate user interface supporting a network connection may be requested to perform user authentication. In detail, to support the cloud print service, the device 100 may need a user interface for performing user authentication, a user interface for receiving information about a destination to which print data is to be transmitted, and a user interface for displaying and selecting an available image forming apparatus. According to one or more exemplary embodiments, the term "user interface" may indicate a user interface (UI) screen image or a control window displayed on a screen of the device 100 and having a function for providing information to the user and receiving an input from the user.

In detail, an operation in which the device 100 provides the cloud print service, according to the present exemplary embodiment, is described below.

The device 100 may receive a print request from the user and generate print data. For example, the device 100 may receive a printer dialog provided by the CUPS. The printer dialog provided by the CUPS may be a user interface which does not support a network connection. The device 100 may generate print data through the CUPS and transmit the generated print data to the cloud print server 200.

In this case, the device 100 may provide a user interface 101 to perform user authentication, receive authentication information from the user through the user interface 101, and use the received authentication information when the user authentication is performed. The authentication information is unique information indicating individual users and may be information such as an identification (ID) of the user or a telephone number allocated to the device 100 of the user. In addition, the authentication information may further include a password.

In detail, the device 100 may transmit the received authentication information to the authentication server 400, and the authentication server 400 may perform user authentication by using the authentication information. The authentication server 400 may transmit a user authentication performance result to the device 100. The device 100 may receive the user authentication performance result and determine the authentication information as valid authentication information.

In this case, the device 100 may acquire print data, which has been generated in a first area, in a second area to add the valid authentication information to the print data and transmit the valid authentication information-added print data to the cloud print server 200. That is, the device 100 may acquire the print data, which has been generated in the first area, in the second area to add, to the print data, the authentication information received through the user interface 101 supporting a network connection in the second area.

The first area may be a system area in which an OS in the device 100 operates. The system area may include a system folder and allow an access only to a user having a system manager authority. The second area is a user area and may be the remaining area except for a portion which the OS uses in the device 100. The user area may be an area in which an application program such as a user authority program and the like are actually executed.

When the print data generated in the first area is acquired in the second area, the device 100 may provide the user interface 101 for performing user authentication. The device 100 may execute the user authority program for performing user authentication to provide the user interface 101.

The user interface 101 for performing user authentication is connectable to a network and may acquire and display information transmitted or received by the device 100.

For example, the device 100 may transmit the authentication information received from the user through the user interface 101 to the authentication server 400. Also, the device 100 may display, through the user interface 101, the user authentication performance result received from the authentication server 400. Also, the device 100 may receive, through the user interface 101, information about a destination, such as a telephone number of the user or a third person, to which print data is to be transmitted and transmit both the print data and the destination information to the cloud print server 200.

In addition, the device 100 may receive information about available image forming apparatuses from the cloud print server 200 and display the received information through the user interface 101.

When the user authentication succeeds, the device 100 may transmit the print data including the valid user authentication to the cloud print server 200.

The device 100 may perform user authentication by using the user interface 101 supporting a network connection, receive needed information from the user, and support the cloud print service while maintaining security.

Figure 2:
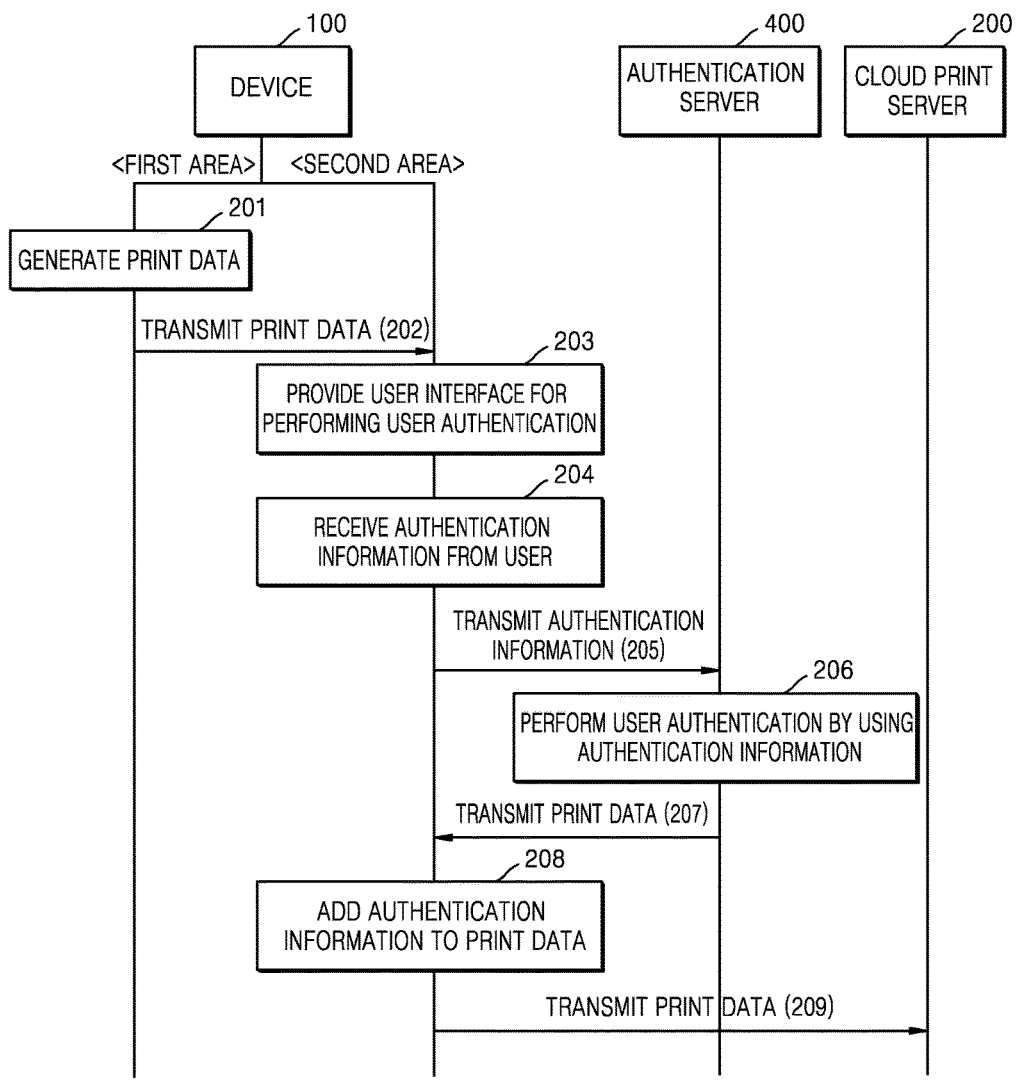
FIG. 2 illustrates a signaling diagram of a method of providing the cloud print service in the cloud print system of FIG. 1, according to an exemplary embodiment.

FIG. 2 illustrates a signaling diagram of a method of providing the cloud print service in the cloud print system 10 of FIG. 1, according to an exemplary embodiment.

Referring to FIG. 2, in operation 201, the device 100 may receive a print request from the user and generate print data. The device 100 may generate the print data in the first area through the CUPS.

In operation 202, the device 100 may transmit the print data generated in the first area to the second area. When the print data is acquired in the second area, the device 100 may provide a user interface for performing user authentication in operation 203. The user interface supports a network connection and may acquire and display information transmitted and received by the device 100.

The first area may be a system area in which the OS in the device 100 operates. The system area may include a system folder and allow an access only to a user having a system manager authority. The second area is a user area and may be the remaining area except for a portion which the OS uses in the device 100. The user area may be an area in which an application program such as a user authority program and the like are actually executed.

In operation 204, the device 100 may receive authentication information from the user through the user interface for performing user authentication. The device 100 may store the received authentication information in the second area.

In operation 205, the device 100 may transmit the authentication information to the authentication server 400, and in operation 206, the authentication server 400 may perform user authentication by using the authentication information. For example, the authentication server 400 may store valid user information pre-registered to receive the cloud print service. The authentication server 400 may compare the received authentication information with the pre-registered user information to determine whether the received authentication information is valid.

In operation 207, the authentication server 400 may transmit a user authentication performance result to the device 100. The device 100 may provide the user authentication performance result to the user by displaying the user authentication performance result on the user interface.

In addition, the device 100 may receive destination information or image forming apparatus information from the user through the user interface. The destination information indicates an account in which the cloud print server 200 stores the print data and may be device identification information corresponding to each account. For example, the device identification information may be a telephone number of a cellular phone or the like corresponding to each account. The image forming apparatus information may indicate an image forming apparatus by which the print data is to be printed when the cloud print server 200 directly prints the print data.

The device 100 may receive a list of available destination information or a list of image forming apparatus information from the cloud print server 200 and display the received list through the user interface and may receive at least one piece of the destination information or the image forming apparatus information selected by the user from the displayed list.

In operation 208, the device 100 may add the authentication information to the print data. For example, the device 100 may add the valid authentication information to a header of the print data.

In operation 209, the device 100 may transmit the authentication information-added print data to the cloud print server 200.

When the print data is received, the cloud print server 200 may confirm a sender by using the added authentication information. The cloud print server 200 may store the print data in an account of the user or a third person based on the destination information. Also, the cloud print server 200 may transmit the print data to an image forming apparatus by which the print data is to be printed, based on the image forming apparatus information.

Figure 3:
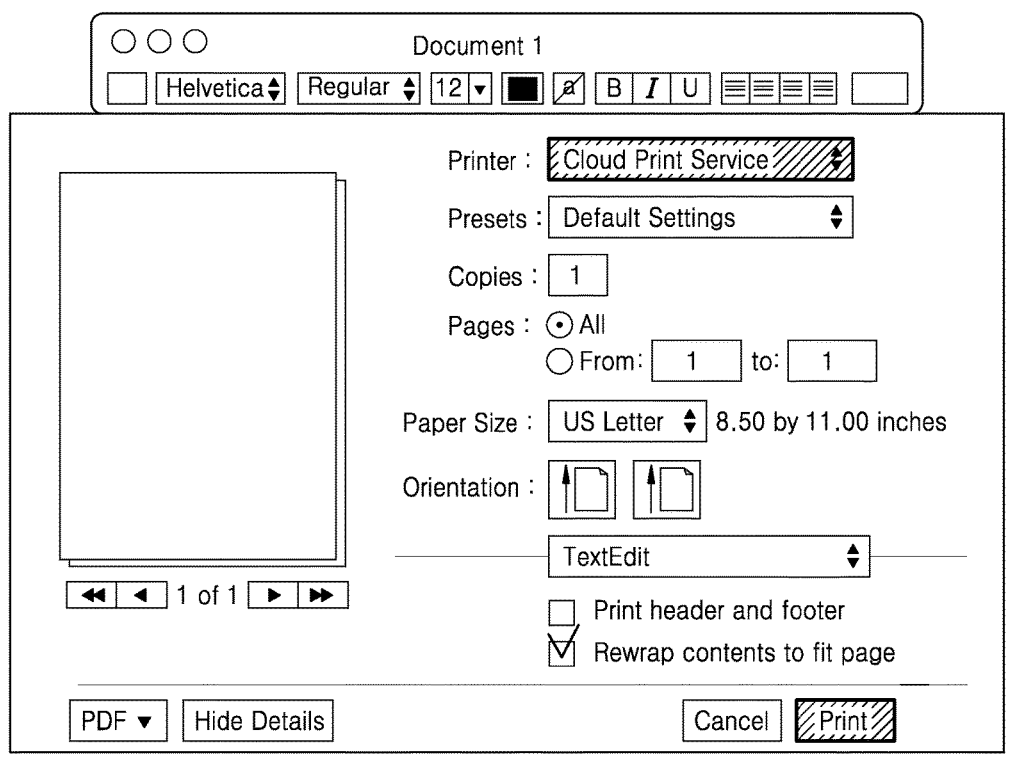
FIG. 3 illustrates a printer dialog provided by a device of FIG. 1, according to an exemplary embodiment.

FIG. 3 illustrates a printer dialog 30 provided by the device 100 of FIG. 1, according to an exemplary embodiment.

The user may input a print request by opening the printer dialog 30 on a content execution screen image to print print data by using the device 100. The printer dialog 30 may be a user interface which does not support a network connection.

The user may input a print request by selecting a cloud print system through the printer dialog 30. When the print request is received from the user, the device 100 may generate print data in the first area.

In detail, the device 100 may generate the print data through the CUPS. The CUPS may include a scheduler, a filter, and a backend. The scheduler may generate print data of a predetermined format, the filter may convert the print data into a format recognizable and outtable by an image forming apparatus, and the backend may transmit the converted print data to an external module of the CUPS. In this case, the predetermined format may be a portable document format (PDF), and the filter may be omitted.

The print data generated in the first area may be transmitted to the second area through the CUPS, and when the print data is acquired in the second area, a user interface for user authentication may be provided.

Figure 4A:
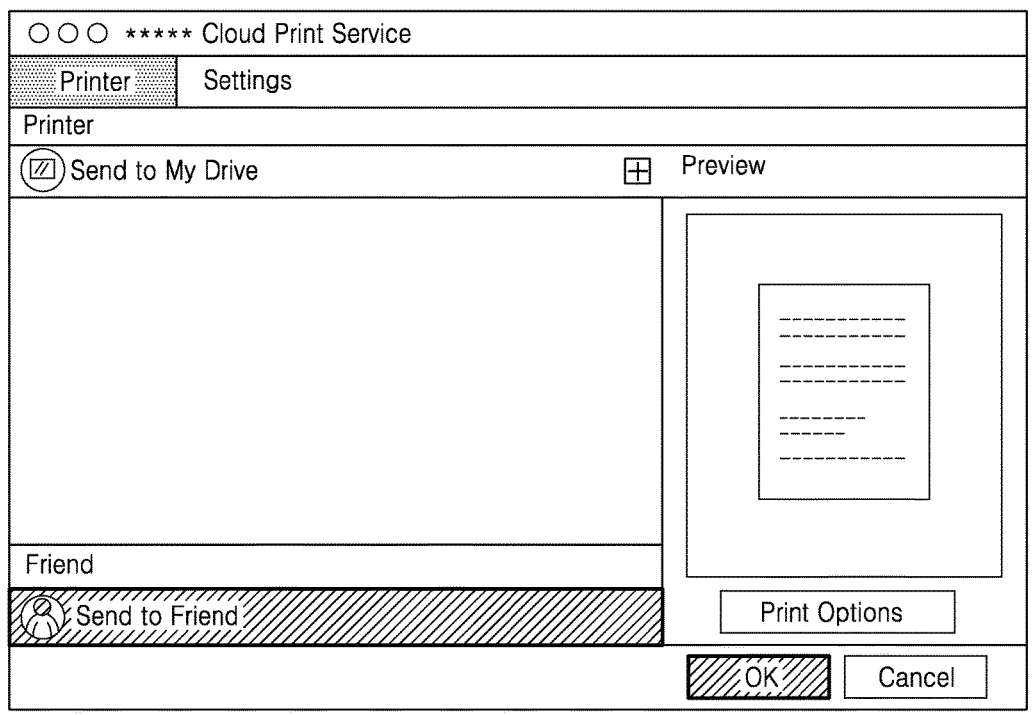
FIGS. 4A through 4C illustrate screen images of user interfaces provided by the device of FIG. 1, according to exemplary embodiments.
Figure 4B:
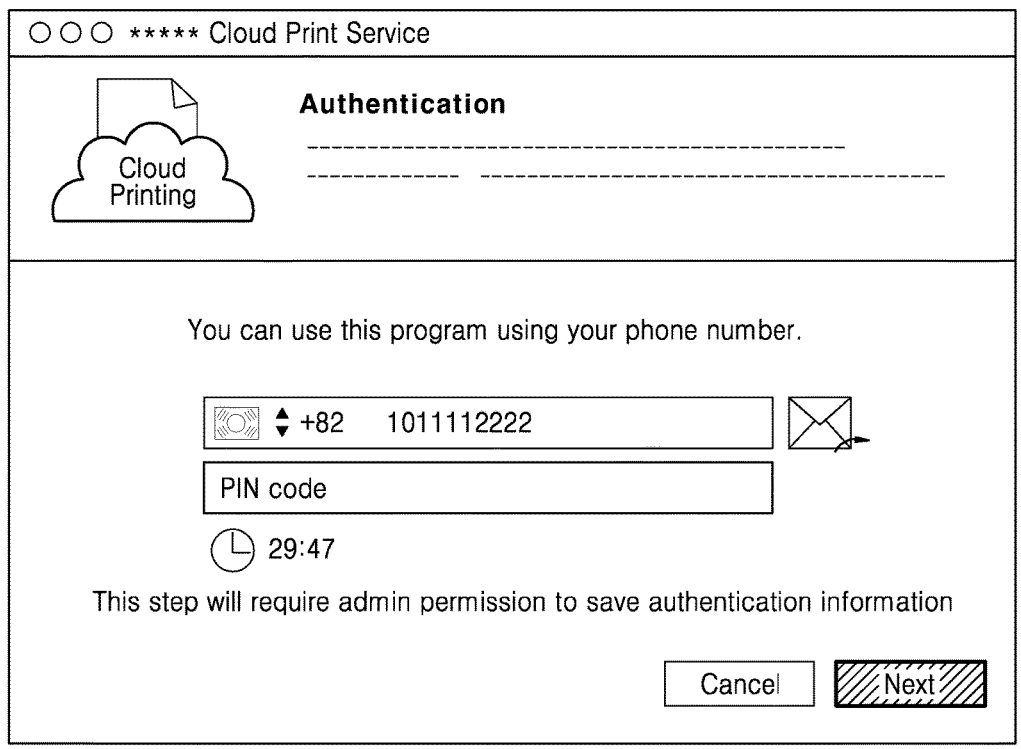
Figure 4C:
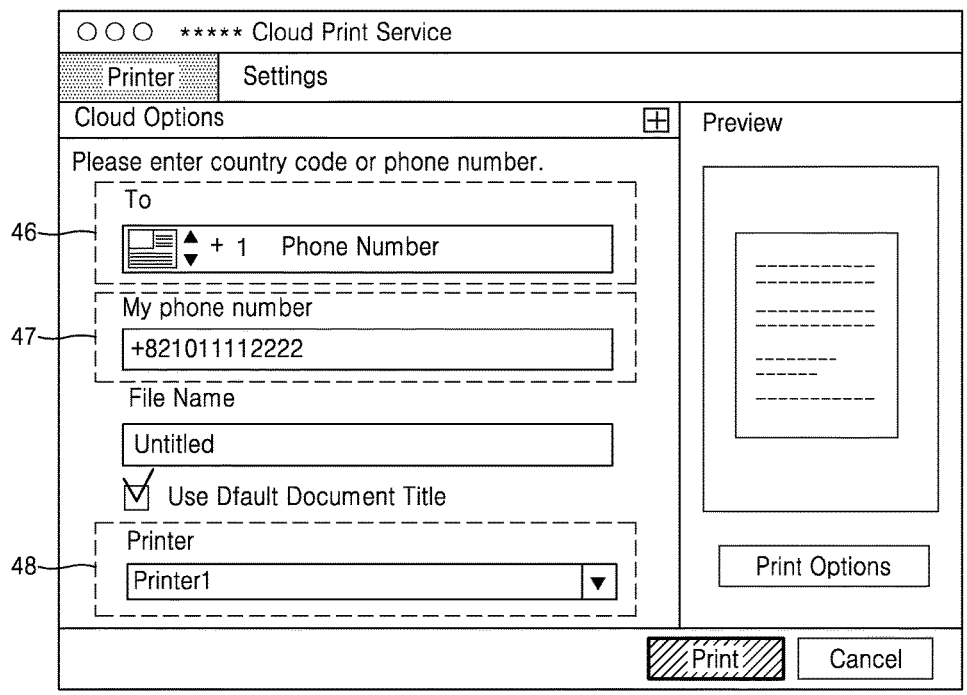

FIGS. 4A through 4C illustrate screen images of user interfaces 40, 42, and 44 provided by the device 100 of FIG. 1, according to exemplary embodiments.

When the user inputs a print request through the printer dialog 30 of FIG. 3, the device 100 may perform an internal operation and provide the user interface 40 of FIG. 4A to the user. The user interfaces 40, 42, and 44 of FIGS. 4A through 4C may be provided by a program executed in the second area may be connectable to a network.

The user may select, through the user interface 40, whether to transmit print data to an account of the user or a third person in the cloud print server 200. For example, the user may select "Send to Friend" through the user interface 40, and in this case, the device 100 may provide the user interface 42.

The user interface 42 may be a user interface for performing user authentication. For example, the device 100 may receive authentication information through the user interface 42. For example, the authentication information may be a telephone number of a cellular phone of the user. The device 100 may transmit the received authentication information to the authentication server 400 so that the authentication server 400 performs user authentication.

Also, the authentication server 400 may further receive a password in addition to the authentication information and perform the user authentication. For example, the authentication server 400 may perform the user authentication by transmitting an arbitrary personal identification number (PIN) code to the device 100 based on the received authentication information and checking whether the same PIN code is received back from the device 100. However, the device 100 is not limited thereto and may perform the user authentication in various ways by transmitting and receiving information to and from an external device.

When the user authentication succeeds, the device 100 may provide the user interface 44 of FIG. 4.

The user interface 44 may be a user interface for setting print options. To set the print options, the device 100 may display information for print option settings and receive a selection on the print options from the user, through the user interface 44. In detail, the device 100 may receive the information for print option settings from the cloud print server 200 by using the authentication information and display the received information for print option settings. The information for print option settings may include information about available image forming apparatuses corresponding to the authentication information, account information of the cloud print server 200 corresponding to the authentication information, destination information corresponding to the authentication information, and the like. Besides, the information for print option settings may include various pieces of information for setting operations performable by an image forming apparatus.

The device 100 may receive information 46 about a destination to which the print data is to be transmitted, such as a telephone number of a cellular phone of a third person, through the user interface 44 and transmit both the print data and the received information 46 to the cloud print server 200. Alternatively, the device 100 may receive a plurality of pieces of destination information corresponding to the authentication information from the cloud print server 200, provide the plurality of pieces of destination information as a list through the user interface 44, and receive the information 46 about a destination to which the print data is to be transmitted, which is selected by the user.

In addition, the device 100 may display valid authentication information through the user interface 44 based on an authentication result received from the authentication server 400.

In addition, the device 100 may receive information about available image forming apparatuses corresponding to the authentication information from the cloud print server 200 and may provide, through the user interface 44, a list 48 of the image forming apparatus information and receive a selection on an image forming apparatus by which the print data is to be printed from the user. The device 100 may transmit the authentication information to the cloud print server 200 and receive information about available image forming apparatuses corresponding to the authentication information.

In addition, through the user interface 44, the device 100 may provide a preview of the print data, an interface for setting a name of the print data, and an interface for setting print options of the print data.

The user may confirm information such as authentication information 47 and request for printing through the user interface 44.

Figure 5:
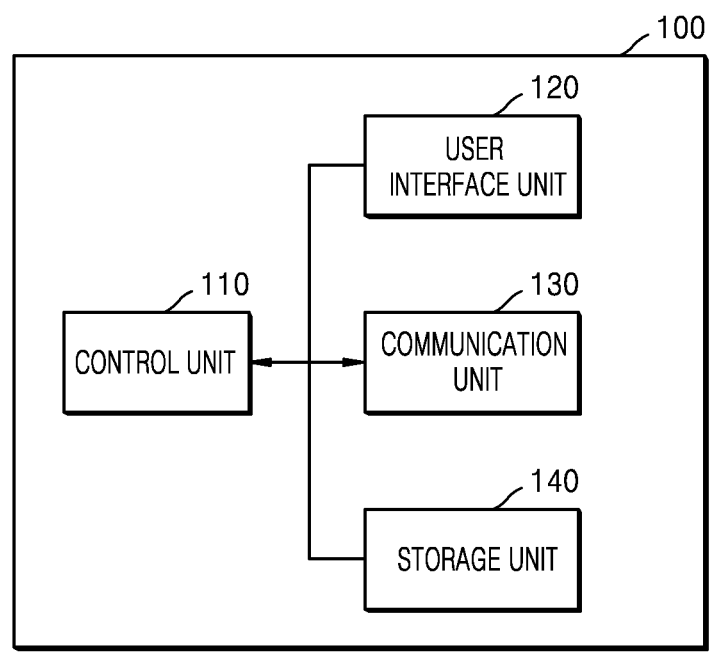
FIG. 5 illustrates a block diagram of a hardware configuration of the device for supporting the cloud print service, which is shown in FIG. 1, according to an exemplary embodiment.

FIG. 5 illustrates a block diagram of a hardware configuration of the device 100 supporting the cloud print service, which is shown in FIG. 1, according to an exemplary embodiment.

Referring to FIG. 5, the device 100 supporting the cloud print service may include a control unit 110, a user interface unit 120, a communication unit 130, and a storage unit 140.

The control unit 110 controls a general operation of the device 100 and may include, for example, a central processing unit (CPU). According to the present exemplary embodiment, the control unit 110 may be based on an UNIX series OS and include the CUPS that is a printing system of the UNIX series OS. FIG. 5 shows only components related to the present exemplary embodiment to prevent the features of the present exemplary embodiment from being obscured. However, it will be understood by those of ordinary skill in the art that other general-use hardware components may be included besides the hardware components shown in FIG. 5.

The control unit 110 may generate print data in the first area in response to a request of the user so that the generated print data is acquired in the second area.

The first area may be a system area in which the OS in the device 100 operates. The system area may include a system folder and allow an access only to a user having a system manager authority. The second area is a user area and may be the remaining area except for a portion which the OS uses in the device 100. The user area may be an area in which an application program such as a user authority program and the like are actually executed.

When the print data is acquired in the second area, the control unit 110 may control the user interface unit 120 to provide a user interface for performing user authentication.

If the user authentication succeeds, the control unit 110 may add authentication information to the print data.

The control unit 110 will be described in more detail below with reference to FIG. 6.

The user interface unit 120 may have a hardware configuration for providing information to the user and receiving an input from the user. The user interface unit 120 may be implemented by a display, such as a monitor, a touch screen, a liquid crystal display (LCD), or a light-emitting diode (LED) display, having a display function and an input device, such as a touch panel, a keyboard, a mouse, and physical buttons, having an input function.

The user interface unit 120 may provide a user interface for performing user authentication when the print data is acquired in the second area.

The user interface unit 120 may be connected to the communication unit 130 to provide a user interface for displaying information transmitted to and received from an external device. For example, the user interface unit 120 may provide a user interface for receiving authentication information to be transmitted to the authentication server 400 from the user and displaying the received authentication information. Also, the user interface unit 120 may provide a user interface for displaying an authentication result received from the authentication server 400.

In addition, the may provide a user interface for acquiring destination information such as a telephone number of a third person.

In addition, the may provide a user interface for displaying available image forming apparatus information received from the cloud print server 200.

The communication unit 130 transmits and receives data to and from an external device through wired/wireless communication. The communication unit 130 may include a WiFi module, a WiFi Direct module, a Bluetooth module, an Ethernet module, and the like.

The communication unit 130 may transmit various kinds of information received through the user interface unit 120 to the cloud print server 200 or the authentication server 400 and receive information from the cloud print server 200 or the authentication server 400.

When user authentication succeeds, the communication unit 130 may transmit print data including valid authentication information to the cloud print server 200.

The storage unit 140 may store various data so as for the device 100 to support the cloud print service and may include, for example, a volatile memory such as random access memory (RAM), a nonvolatile memory such as read-only memory (ROM), a hard disk drive (HDD), or a solid state drive (SSD).

The storage unit 140 may store information such as authentication information received from the user interface unit 120.

The storage unit 140 may be divided into the first area including the system folder and the second area including a user folder.

Figure 6:
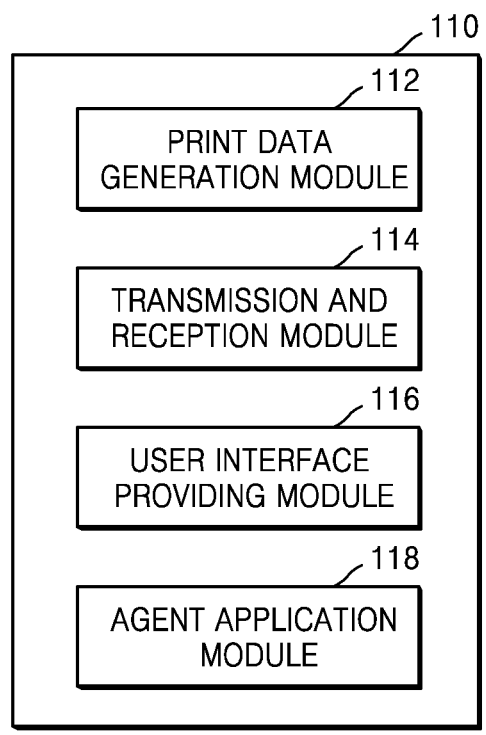
FIG. 6 illustrates a block diagram of a control unit of the device of FIG. 5, according to an exemplary embodiment.

FIG. 6 illustrates a block diagram of the control unit 110 of the device 100 of FIG. 5, according to an exemplary embodiment.

Referring to FIG. 6, the control unit 110 of the device 100 may include a print data generation module 112, a transmission and reception module 114, and a user interface providing module 116. The control unit 110 of the device 100 may further include an agent application module 118.

The print data generation module 112 may generate print data by receiving a print request from the user. For example, the print data generation module 112 may be the CUPS. The print data generation module 112 may be executed in the first area.

In detail, the print data generation module 112 may include a post printer description for defining driver information, print capability information, and the like, a printer dialog extension (PDE) for providing a printer dialog, a scheduler for generating print data of a predetermined format, a filter for converting the print data into a format recognizable and outtable by an image forming apparatus, and a backend for transmitting the print data to the transmission and reception module 114. In this case, the predetermined format may be PDF, and the filter may be omitted.

The print data generation module 112 may transmit the print data generated in the first area to the transmission and reception module 114 executed in the second area.

When the print data is acquired in the second area, the transmission and reception module 114 may control the user interface providing module 116 to provide a user interface for performing user authentication.

The user interface providing module 116 may be executed in the second area. The user interface providing module 116 may provide information received from the cloud print server 200 or the authentication server 400 in the outside through the communication unit 130 to the user and receive authentication information and the like from the user.

The communication unit 130 may transmit authentication information received from the user interface providing module 116 to the authentication server 400 so that the authentication server 400 perform user authentication. If the user authentication succeeds, the transmission and reception module 114 may add valid authentication information to the print data. The transmission and reception module 114 may transmit the authentication information-added print data to the cloud print server 200.

If the print data is completely transmitted, the user interface providing module 116 may receive state information indicating whether the print data has been successfully transmitted from the transmission and reception module 114 and display the received state information on a user interface. For example, the state information may include transmission success, the occurrence of an error, not authorized, or the like.

The agent application module 118 may transmit print data received from the cloud print server 200 to a local image forming apparatus registered in the device 100. For example, the agent application module 118 may transmit print data to a local image forming apparatus which is not connected to the cloud print server 200.

To transmit data, the agent application module 118 may map and manage print authentication information and an image forming apparatus list. The agent application module 118 may transmit print data transmitted to an account of the user according to authentication information to a mapped image forming apparatus based on the managed list.

In detail, the agent application module 118 may periodically monitor whether print data is received in the account of the user in the cloud print server 200 by using authentication information on the user, which has been received from the transmission and reception module 114. Alternatively, the agent application module 118 may periodically monitor the cloud print server 200 with respect to whether print data of which a destination is a corresponding local image forming apparatus is received by using identification information of registered local image forming apparatuses.

The agent application module 118 may be executed in the second area.

Figure 7:
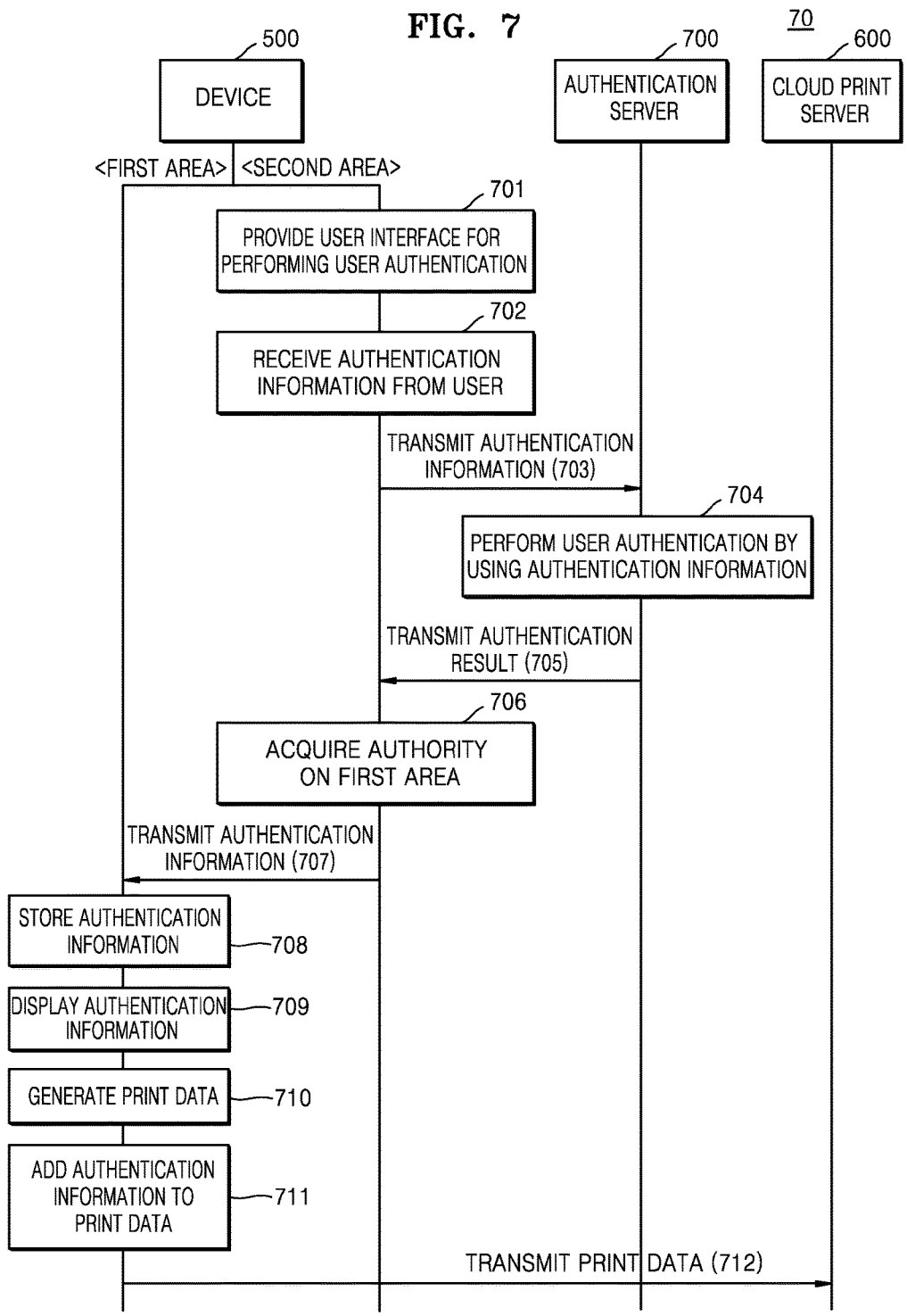
FIG. 7 illustrates a signaling diagram of a method of providing the cloud print service in a cloud print system, according to another exemplary embodiment.

FIG. 7 illustrates a signaling diagram of a method of providing the cloud print service in a cloud print system 70, according to another exemplary embodiment.

Referring to FIG. 7, in operation 701, a device 500 may provide a user interface for performing user authentication. The device 500 may provide the user interface by executing, in the second area, a program for providing the user interface for performing user authentication.

The second area is a user area and may be the remaining area except for a portion which an OS uses in the device 500. The user area may be an area in which an application program such as a user authority program and the like are executed.

In operation 702, the device 500 may receive authentication information from a user through the user interface. The authentication information is unique information indicating individual users and may be information such as an ID of the user or a telephone number allocated to the device 500 of the user. In addition, the authentication information may further include a password.

In operation 703, the device 500 may transmit the authentication information to an authentication server 700 so that the authentication server 700 perform user authentication. In operation 704, the authentication server 700 may perform user authentication by using the authentication information. For example, the authentication server 700 may store valid user information pre-registered to receive the cloud print service. The authentication server 700 may compare the received authentication information with the pre-registered user information to determine whether the received authentication information is valid.

In operation 705, the authentication server 700 may transmit a user authentication performance result to the device 500.

When the user authentication performance result is received, in operation 706, the device 500 may provide a user interface for acquiring an authority on the first area to the user and acquire authority information on the first area through the user interface.

The first area may be a system area in which the OS in the device 500 operates. The system area may include a system folder and allow an access only to a user having a system manager authority. For example, the authority on the first area may be the system manager authority, and the authority information on the first area may be a password of a system manager.

If the authority information on the first area is acquired, in operation 707, the device 500 may transmit valid authentication information of which user authentication has been performed by the authentication server 700 to the first area by using the authority information on the first area. In operation 708, the device 500 may store the authentication information in the system folder of the device 500.

In operation 709, the device 500 may display the authentication information by accessing the authentication information stored in the first area.

In detail, the user may input a print request by opening a printer dialog on a content execution screen image to print content. The printer dialog may be a user interface provided by the PDE of the CUPS. The printer dialog may not support a network connection and may be executed in the first area and be accessible only to a system folder in the first area.

When the user inputs a print request by opening the printer dialog, in operation 710, the device 500 may generate print data of a predetermined format in the first area and display the authentication information on the printer dialog by accessing the authentication information stored in the first area. Operation 710 may be performed in prior to operation 709, or both operations 709 and 710 may be performed.

In addition, the device 500 may receive destination information from the user through the printer dialog. The destination information is identification information indicating an account in which a cloud print server 600 stores the print data. For example, the destination information may be information such as a telephone number of a third person.

In operation 711, the device 500 may add the authentication information to the print data. For example, the device 500 may add the authentication information to a header of the print data.

In operation 712, the device 500 may transmit the authentication information-added print data to the cloud print server 600.

The device 500 may transmit the print data to the account of the user or an account of a third person in the cloud print server 600 based on the destination information.

When the print data is received, the cloud print server 600 may confirm a sender by using the added authentication information. The cloud print server 600 may store the print data in the account of the user or the third person based on the destination information.

Figure 8:
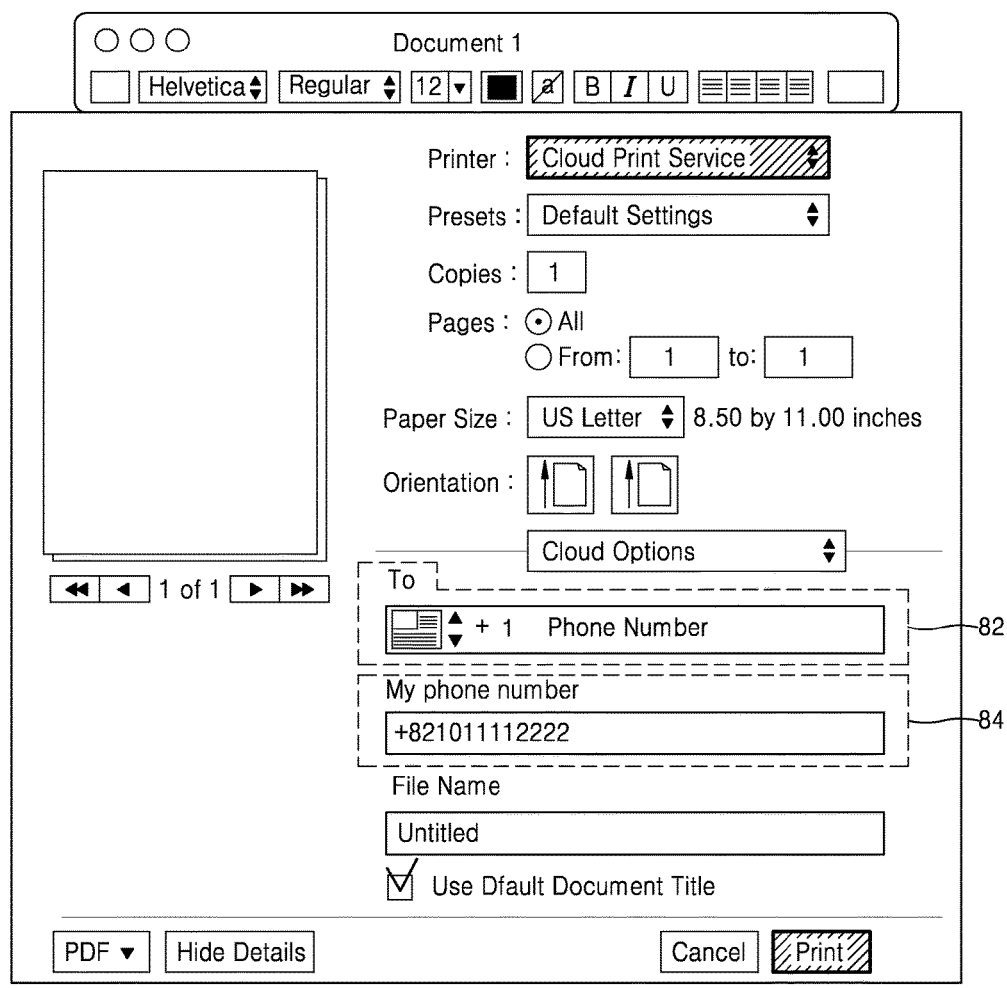
FIG. 8 illustrates a screen image of a user interface provided by the device of FIG. 7, according to an exemplary embodiment.

FIG. 8 illustrates a screen image of a user interface provided by the device 500 of FIG. 7, according to an exemplary embodiment.

The user may input a print request by opening a printer dialog 80 on a content execution screen image to print content by using the device 500. The printer dialog 80 may be a user interface provided by the PDE of the CUPS. The printer dialog 80 may not support a network connection and may be accessible only to the first area.

The user may input a print request by selecting a cloud print system through the printer dialog 80. If the print request is received from the user, the device 500 may generate print data in the first area.

The device 500 may receive information 82 about a destination to which the print data is to be transmitted, such as a telephone number of a third person, through the printer dialog 80 and transmit both the print data and the destination information 82 to the cloud print server 600.

In addition, the device 500 may display authentication information 84 stored in the first area, through the printer dialog 80.

In addition, the device 500 may provide a preview of the print data, an interface for setting a name of the print data, and an interface for setting print options of the print data.

Figure 9:
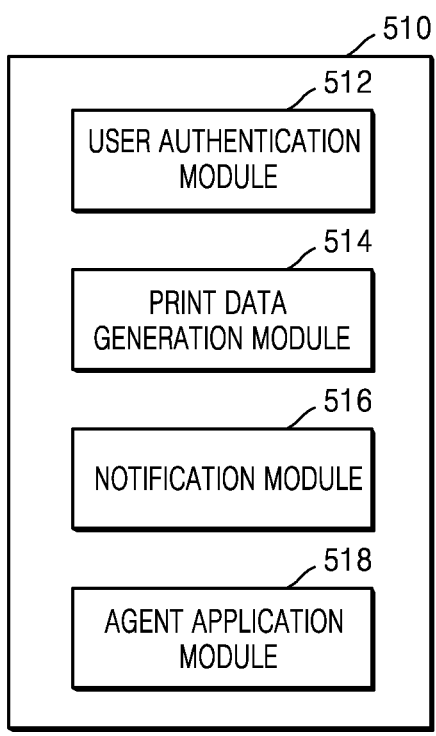
FIG. 9 illustrates a block diagram of a control unit of the device of FIG. 7, according to an exemplary embodiment.

FIG. 9 illustrates a block diagram of a control unit 510 of the device 500 of FIG. 7, according to an exemplary embodiment.

Like the device 100 of FIG. 5, the device 500 of FIG. 7 may include the control unit 510, a user interface unit (not shown), a communication unit (not shown), and a storage unit (not shown), and corresponding parts described with reference to FIG. 5 may be applied to the device 500 of FIG. 7. Particularly, the description of the user interface unit 120, the communication unit 130, and the storage unit 140 may be similarly applied to the device 500 of FIG. 7.

Referring to FIG. 9, the control unit 510 of the device 500 of FIG. 7 may include a user authentication module 512, a print data generation module 514, a notification module 516, and an agent application module 518.

The user authentication module 512 may perform user authentication and store authentication information valid to the device 500.

The user authentication module 512 may provide a user interface for performing user authentication. The user authentication module 512 may be executed in the second area, and the user interface for performing user authentication may be provided in the second area.

The user authentication module 512 may receive authentication information from the user through the user interface. The user authentication module 512 may transmit the authentication information to the authentication server 700 through the communication unit so that the authentication server 700 performs user authentication. If the user authentication succeeds in the authentication server 700, the user authentication module 512 may receive a user authentication performance result from the authentication server 700 through the communication unit.

If the user authentication performance result is received, the user authentication module 512 may provide a user interface for acquiring an authority on the first area of the device 500 to the user and acquire authority information on the first area from the user through the user interface.

The user authentication module 512 may store the authentication information in the first area by using the authority information on the first area.

The print data generation module 514 may generate print data by receiving a print request from the user. For example, the print data generation module 514 may be the CUPS. The print data generation module 514 may be executed in the first area.

In detail, the print data generation module 514 may include a post printer description for defining driver information, print capability information, and the like, a PDE for providing a printer dialog, a scheduler for generating print data of a predetermined format, a filter for converting the print data into a format recognizable and outtable by an image forming apparatus, and a backend for transmitting the print data to the communication unit. In this case, the predetermined format may be PDF, and the filter may be omitted.

When the user opens a printer dialog for request for printing print data, the print data generation module 514 may access the authentication information stored in the first area and display the authentication information on the printer dialog.

In addition, the print data generation module 514 may receive destination information, print option information, and the like from the user through the printer dialog.

The print data generation module 514 may add authentication information to the print data generated in the first area. For example, the print data generation module 514 may add the valid authentication information stored in the first area to the print data. The print data generation module 514 may transmit the print data to the cloud print server 600 through the communication unit.

The notification module 516 may execute a user interface for displaying a transmission result of the print data. For example, if the print data is completely transmitted, the notification module 516 may receive state information indicating whether the print data has been successfully transmitted from the print data generation module 514 and display the received state information on a user interface. For example, the state information may include transmission success, the occurrence of an error, not authorized, or the like.

The notification module 516 may be executed in the second area.

The agent application module 518 may perform the same operation as the agent application module 118 of FIG. 6. The agent application module 518 may be executed in the second area.

FIG. 10 illustrates a flowchart of a method by which the cloud print system of FIG. 1 provides the cloud print service, according to an exemplary embodiment.

In operation 1002, the device 100 may acquire print data, which has been generated in the first area, in the second area.

The first area may be a system area in which the OS in the device 100 operates. The system area may include a system folder and allow an access only to a user having a system manager authority. The second area is a user area and may be the remaining area except for a portion which the OS uses in the device 100. The user area may be an area in which an application program such as a user authority program and the like are actually executed.

When a print request is received from the user, the device 100 may generate print data in the first area through the CUPS and acquire the generated print data in the second area.

In operation 1004, the device 100 may provide a user interface for performing user authentication according to the acquisition of the print data in the second area. The user interface may be provided by a program executed in the second area. Also, the user interface may be connectable to a network and acquire and display information transmitted or received by the device 100.

In operation 1006, the device 100 may receive authentication information from the user through the user interface.

The authentication information is unique information indicating individual users and may be information such as an ID of the user or a telephone number allocated to the device 100 of the user. In addition, the authentication information may further include a password.

In operation 1008, the device 100 may transmit the acquired print data to the cloud printer server 200 if user authentication succeeds by using the received authentication information.

In detail, the device 100 may transmit the received authentication information to the authentication server 400. The authentication server 400 may perform user authentication by using the authentication information and transmit a user authentication performance result to the device 100 if the user authentication succeeds. The device 100 may receive the user authentication performance result to determine whether the authentication information is valid.

If the user authentication succeeds, the device 100 may add the authentication information to the print data and transmit the authentication information-added print data to the cloud printer server 200. The cloud printer server 200 may confirm a sender of the print data through the authentication information.

In addition, the device 100 may receive destination information such as a telephone number of the user or a third person through a user interface and transmit both the print data and the destination information to the cloud printer server 200.

The device 100 may perform user authentication by using a user interface supporting a network connection, receive needed information from the user, and support the cloud print service while maintaining security.

The methods described above can be written as computer programs and can be implemented in general-use digital computers that execute the programs using a computer-readable recording medium. Examples of the computer-readable recording medium include storage media such as magnetic storage media (e.g., ROM, floppy disks, hard disks, etc.) and optical recording media (e.g., CD-ROMs, or DVDs).

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A device to support a print service, the device comprising memory to store executable instructions and at least one processor to execute the instructions to:
   implement, in the memory,
      a system area accessible with an access authority to access the system area and inaccessible by a user not having the access authority to the system area, and in the system area, print data associated with the print service is to be generated, and
      an application area accessible by the user not having the access authority to the system area, and in the application area, the print data is to be acquired from the system area and transmittable from the application area to at least one external server associated with the print service;
   in response to a request, control a process to acquire in the application area the print data generated in the system area;
   provide a user interface to receive authentication information associated with performing a user authentication to transmit the print data acquired in the application area to the at least one external server, when the print data generated in the system area is acquired in the application area; and
   transmit the print data acquired in the application area to the at least one external server, in response to a successful authentication of the user based on the received authentication information.

2. The device of claim 1, wherein the at least one processor is to execute the instructions to:
   generate the print data in the system area, to control the print data generated in the system area to be acquired in the application area.

3. The device of claim 1, wherein:
   the system area is an area in which an operating system of the device is to operate, and
   the application area is an area in which an application program including the user interface is to be executed.

4. The device of claim 1, wherein the at least one processor is to execute the instructions to transmit the received authentication information to at least one authentication server and receive a result of the performing the user authentication from the at least one authentication server to determine the successful authentication of the user by the user authentication.

5. The device of claim 1, wherein the at least one processor is to execute the instructions to execute a user authorization program in the application area to provide the user interface to receive the authentication information.

6. The device of claim 1, wherein the at least one processor is to execute the instructions to:
   convert a content selected by the user into a data format in response to a request of the user, to generate the print data in the system area.

7. The device of claim 1, wherein the at least one processor is to execute the instructions to display any one of
   the authentication information, and/or
   in response to the performing the user authentication, a result of the performing the user authentication.

8. The device of claim 1, wherein the at least one processor is to execute the instructions to add the received authentication information to the acquired print data and transmit the print data including the added authentication information to the at least one external server.

9. The device of claim 1, wherein accessing the system area requires acquiring the access authority.

10. A method by a device to provide a print service associated with the device capable of being communicatively coupled to at least one external server, the method comprising:
performing, by the device:
implementing, in a memory,
a system area accessible with an access authority and inaccessible by a user not having the access authority to the system area, and in the system area print data associated with the print service is to be generated, and
an application area accessible by the user not having the authority to the system area, and in the application area the print data is to be acquired from the system area and transmittable from the application area to the at least one external server associated with the print service;
in response to a request, controlling a process to acquire in the application area the print data, which has been generated in the system area;
providing a user interface to receive authentication information associated with performing a user authentication to transmit the print data acquired in the application area to the at least one external server, when the print data generated in the system area is acquired in the application area; and
receiving the authentication information from the user through the user interface; and
transmitting the print data acquired in the application area to the at least one external server, in response to a successful authentication of the user based on the received authentication information.

11. The method of claim 10, wherein:
the system area is an area in which an operating system of the device is to operate, and
the application area is an area in which an application program including the user interface is to be executed.

12. The method of claim 10, further comprising:
transmitting the received authentication information to at least one authentication server to perform the user authentication; and
receiving a result of the performing the user authentication from the at least one authentication server to determine the successful authentication of the user by the user authentication.

13. The method of claim 10, wherein the providing the user interface comprises executing a user authorization program in the application area to provide the user interface to receive authentication information.

14. The method of claim 10, wherein the controlling the print data, which has been generated in the system area, to be acquired in the application area comprises converting a content selected by the user into a data format in response to a request of the user, to generate the print data in the system area.

15. The method of claim 10, further comprising
displaying any one of
the authentication information, and/or
in response to the performing the user authentication, a result of the performing the user authentication.

16. The method of claim 10, wherein the transmitting the acquired print data to the at least one external server comprises adding the received authentication information to the acquired print data and transmitting the print data including the added authentication information to the at least one external server.

17. A non-transitory computer-readable recording medium storing a computer-executable program to execute a process by a device to provide a print service associated with the device capable of being communicatively coupled to at least one external server, the print service process by the device comprising:
providing a user interface to receive authentication information associated with performing user authentication to transmit print data associated with the print service, which is implemented in an application area in a memory of the device, the application area accessible by a user not having an access authority to a system area in the memory;
receiving authentication information from the user through the user interface;
storing the received authentication information in the system area of the device, the system area accessible with the access authority and inaccessible by the user not having the access authority, in response to a successful authentication of the user by the user authentication to access the print data based on the authentication information;
receiving information associated with at least one print option setting from a server among the at least one external server by using the authentication information stored in the system area of the device; and
providing a user interface to set the at least one print option by using the received information associated with the at least one print option setting.

18. The method of claim 17, further comprising displaying the received information associated with the at least one print option setting through the user interface associated with the setting the at least one print option and receiving a selection of the at least one print option from the user.

19. The method of claim 17, wherein the received information associated with the at least one print option setting includes information about one or any combination of an available image forming apparatus corresponding to the authentication information, account information of the server corresponding to the authentication information, and/or destination information corresponding to the authentication information.

* * * * *